Figure 1:
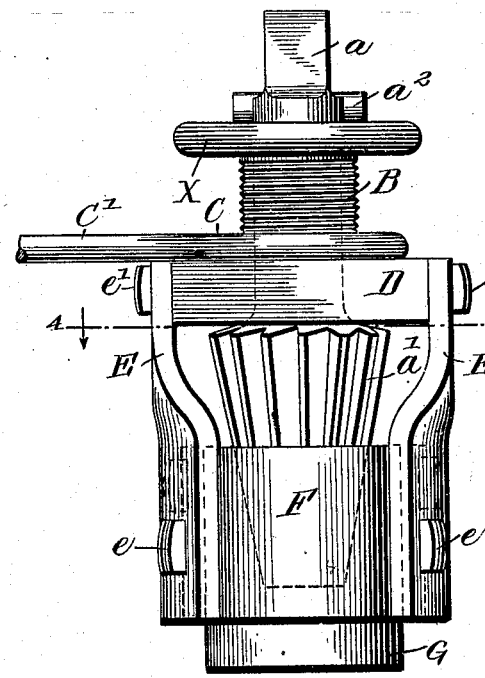

W. F. PORTER.
PIPE REAMER.
APPLICATION FILED JUNE 3, 1908.

924,378.

Patented June 8, 1909.

WITNESSES
Samuel E. Wade
Edw. W. Byrn.

INVENTOR
WILLIAM F. PORTER.
BY Munn & Co
ATTORNEYS.

UNITED STATES PATENT OFFICE.

WILLIAM F. PORTER, OF DUKE CENTER, PENNSYLVANIA.

PIPE-REAMER.

No. 924,378.  Specification of Letters Patent.  Patented June 8, 1909.

Application filed June 3, 1908. Serial No. 436,394.

*To all whom it may concern:*

Be it known that I, WILLIAM F. PORTER, a citizen of the United States, and a resident of Duke Center, in the county of McKean and State of Pennsylvania, have made certain new and useful Improvements in Pipe-Reamers, of which the following is a specification.

My invention is in the nature of a novel construction of pipe reamer for reaming out the ends of pipes or tubing such, for instance, as oil well tubing, and it consists in the novel construction and arrangement of parts whereby a reamer is provided which is adapted to ream out tubes or pipes of varying diameter as will be hereinafter more fully described with reference to the drawing, in which—

Figure 2:
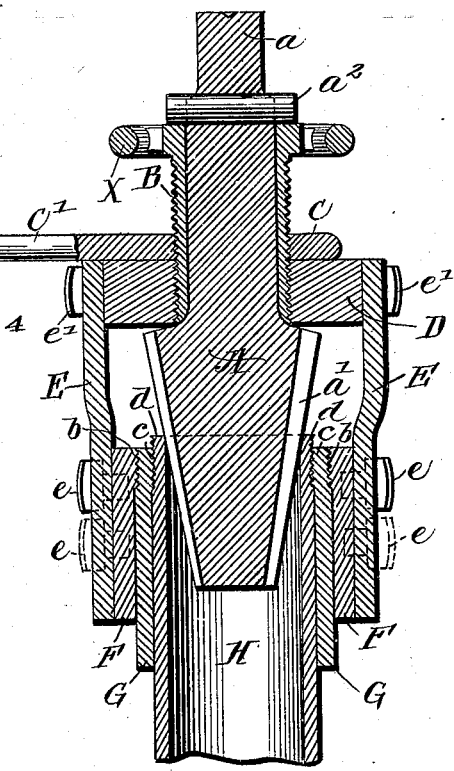
Figure 3:
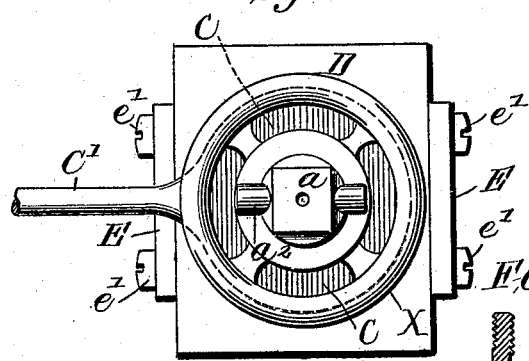
Figure 4:
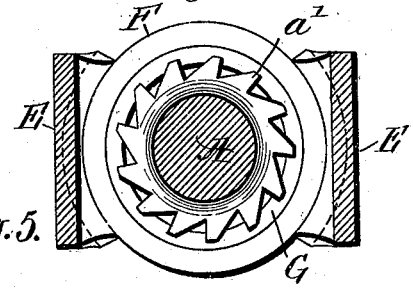
Figure 5:
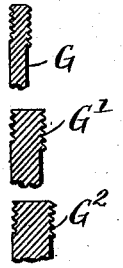

Figure 1 is a side elevation of my improved reamer. Fig. 2 is a vertical central section of the same showing it applied to the end of an oil well tube. Fig. 3 is a plan view. Fig. 4 is a transverse section on line 4—4 of Fig. 1, and Fig. 5 represents sectional edges of interchangeable bushing sleeves for adapting my reamer to be used on pipes or tubes of varying diameter.

In the drawing, A represents a reamer head which is of tapering form smallest at the lower end and provided along its conical sides with longitudinal cutting flanges $a'$. The shank of this reamer is surrounded by a swiveling feed sleeve B having an external screw thread which meshes with an interior screw thread of a cross head D. This feed sleeve B is retained between the shoulder of the reamer and a cross pin $a^2$, detachably seated in a transverse hole in the shank of the reamer below the squared end $a$, so that the shank of the reamer may freely turn within the feed sleeve B. The feed sleeve B has a hand wheel X for turning it.

The cross head D is connected by two longitudinal bars E, E, to a frame ring F by means of bolts $e$ and $e'$, which parts are by this means rigidly connected together, the cross head D being sustained in elevated position a short distance above the ring F so as to leave the upper portion of the reamer A exposed. Surrounding the feed sleeve B is a feed and clamp nut C whose perforation is provided with an interior screw thread meshing with the external screw threads of the feed sleeve B. This clamp nut C is provided on one side with a radially extending handle C', by means of which the nut may be turned upon the sleeve B and be made to jam tightly against the cross head D and thereby lock the feed sleeve B and the cross head D rigidly together. By turning back the clamp nut C, however, it may be made to rise from the cross head D and thus permit the feed sleeve B to be turned down by reason of its screw thread through the cross head D to cause the reamer A to advance into the tube to be reamed.

H is a tube or section of pipe whose upper end is designed to be reamed out interiorly by means of the reamer head A. This section of pipe or tube G is held immovably in position during the reaming action by a screw threaded connection with the ring F. As shown in Fig. 2 this screw threaded connection between the tube H and the ring F is effected by means of an intermediate bushing G. This bushing G, however, for the largest size of tube is not necessary, as the exterior screw thread $d$ on the largest size of tube may directly engage the interior screw threads $b$ of the ring F. Where smaller tubes H, however, are to be employed, interchangeable bushings G of varying size are to be employed in filling the varying spaces between the tubes acted upon and the ring F. These graded thicknesses of bushing tubes are shown in Fig. 5, in which G will represent the thickness of bushing tubes which may be employed in acting upon tubes of the size next smaller than the maximum size (which engages directly with the ring F). For the still smaller size of tube to be reamed, the bushing G will be removed and a thicker bushing G' (Fig. 5) will be employed and for the smallest size of tube a still thicker size of bushing $G^2$ will be employed. It will thus be seen that by having a series of bushing rings G, G' and $G^2$ of varying thicknesses, that tubes H of varying diameter may be immovably held within the frame ring F.

In adjusting the screw threaded connection of the frame ring and the bushing ring, the screw thread $b$ at the top of the frame ring is of somewhat smaller diameter than the smooth lower portion and the exterior screw thread of the bushing ring is of somewhat smaller diameter than the smooth exterior portion of the bushing ring, as will be seen from Fig. 2. The interior screw thread $c$ of the bushing ring is also of somewhat smaller diameter than the interior smooth portion of the bushing ring so as to enable the screw thread $c$ to engage the screw threads $d$ cut into the periphery of the tube H.

In operating upon a tube H for the purpose of reaming out the end of the same, the screw threaded end of such tube is turned into either the threaded interior of the frame ring F or the bushing ring G according to the size of the tube being acted upon. The handle nut C being then turned up on the feed sleeve B far enough to allow the sleeve B and the reamer A to be turned down into the end of the tube H until the tapering cutters $a'$ shall bear against the interior edge of the tube; nut C is turned to a jamming contact with the cross head D, thereby fixing immovably the feed sleeve B, and the reamer A is then turned by means of any long handled wrench applied to the upper squared end $a$ which allows the cross pin $a^2$ to turn upon the top of the feed sleeve and the reamer to swivel within the sleeve with its cutting edges in contact with the upper edge of the tube to be reamed. As fast as the metal is cut away the feed sleeve B is turned down to advance the reamer into the tube and the feed sleeve again fixed by the jam nut C and rotary movement again applied to the upper end of the reamer.

I claim—

A pipe reamer comprising an interiorly screw-threaded frame ring, an interiorly threaded cross head, longitudinally arranged straps connecting these parts, said straps being provided with removable fastening devices for permitting the removal either of said ring or of said cross head, an externally screw threaded feed sleeve extending through said cross head, a reamer having a tapered cutting head and shank arranged within said feed sleeve, and means for locking said feed sleeve to said cross head.

WILLIAM F. PORTER.

Witnesses:
JAMES GEORGE,
CHARLES T. EVANS.